US007770098B2

(12) United States Patent
Kimura

(10) Patent No.: US 7,770,098 B2
(45) Date of Patent: Aug. 3, 2010

(54) SIGNAL PROCESSING APPARATUS AND METHOD THEREFOR

(75) Inventor: Tomoaki Kimura, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 11/464,941

(22) Filed: Aug. 16, 2006

(65) Prior Publication Data

US 2007/0041453 A1 Feb. 22, 2007

(30) Foreign Application Priority Data

Aug. 18, 2005 (JP) ............................. 2005-238703

(51) Int. Cl.
*H03M 13/00* (2006.01)
*H04L 1/00* (2006.01)
*H04L 25/08* (2006.01)
*H04B 1/10* (2006.01)

(52) U.S. Cl. .................. 714/817; 375/254; 375/346
(58) Field of Classification Search ................ 375/254, 375/249, 346; 714/746, 817
See application file for complete search history.

(56) References Cited

U.S. PATENT DOCUMENTS

| 4,385,393 A | * | 5/1983 | Chaure et al. ............. 375/249 |
| 4,660,213 A | * | 4/1987 | Holsinger et al. ........... 375/261 |
| 5,299,233 A | * | 3/1994 | Asghar et al. .............. 375/346 |

(Continued)

FOREIGN PATENT DOCUMENTS

| JP | 05-251998 | 9/1993 |
| JP | 09-200579 | 7/1997 |
| JP | 2004-221983 | 8/2004 |

OTHER PUBLICATIONS

Matsumoto et al., A restoration method by using a novel multi-window Impulse detector, Sep. 2001, Trans. on the Institute of Electronics, Info. and Comm. Eng. vol. J84-A Issue 9, p. 1-42.*

(Continued)

*Primary Examiner*—Shelly A Chase
(74) *Attorney, Agent, or Firm*—Steven Chiu

(57) ABSTRACT

Processing a coded signal formed so that multiple signal points, having individual signal values consonant with coded values, are arranged in accordance with a predetermined order. A signal restoration unit calculates an average value for signal values at signal points immediately preceding and following a predetermined signal point. The predetermined signal point comprises the coded signal. The signal restoration unit calculates, for selected preceding signal points, a signal value difference for the two selected signal points, and obtains first difference values. The signal restoration unit calculates, for selected following signal points, a signal value difference for the two selected signal points, and obtains second difference values. The signal restoration unit corrects the average value by employing either one or a plurality of either the first or the second, or both first and second difference values to obtain a restored value for a signal value at the predetermined signal point.

20 Claims, 9 Drawing Sheets

U.S. PATENT DOCUMENTS 6,985,539 B2 * 1/2006 Kaku et al. ............ 375/297
7,113,557 B2 * 9/2006 Kaku et al. ............ 375/346
7,522,513 B2 * 4/2009 Henriksson ............ 370/208

OTHER PUBLICATIONS

Hore et al., Prediction based Image restoration using a multiple window configuration, Aug. 2002, Opt. Eng. Society of Photo-Optical Instrumentations Eng., p. 1855-1865.*

Tetsuo Matsumoto, Takefumi Yokei, and Akira Taguchi "A Restoration Method by Using a Novel Multi-Window Impulse Detector" 2001, vol. J84-A No. 9, pp. 1179-1191.

Matsumoto et al., "A Restoration Method by Using a Novel Multi-Window Impulse Detector", Abstract, Transactions of the Institute of Electronics, Information and Communication Engineers, vol. J84-A, Issue 9, Sep. 2001.

* cited by examiner

SIGNAL PROCESSING APPARATUS AND METHOD THEREFOR

BACKGROUND OF THE INVENTION

1. Field of the Invention

The present invention relates to signal processing for image signals and audio signals, and particularly to a signal processing method and system for removing noise from a signal on which an impulse noise has been superimposed.

2. Description of Background

When a variety of information is coded for characters, colors, sounds and images, for example, the coded signals thus obtained, such as those for image and audio signals, have signal values that, unlike sequential analog signals, correspond to coded numerical values at individual discrete points (hereinafter referred to as "signal points"). And these multiple signal points are contiguous, based on a predetermined time base order or a predetermined spatial order. The definition for the contiguous arrangement of signal points in a time based order is that, in the case of audio signals, sounds are expressed by sequentially transmitting, at predetermined time intervals, signal values for signal points that represent separate individual time elements in the time based order. Further, the definition of a contiguous arrangement in the spatial order is that, in the case of image signals, an image is expressed by transmitting, at predetermined spatial intervals, signal values located at signal points that represent spatially separated individual pixels. There is a case wherein, for a variety of reasons, impulse noise is superimposed during the coding or the transfer of a coded signal, such as an audio signal or an image signal. Conventionally, a median filter is generally employed in order to remove impulse noise from a signal. A median filter is one that, instead of providing for a coded signal a signal value at a signal point, whereat noise is superimposed, provides as a signal value a middle (median) value at a signal point within a predetermined range, at the center of which is located the signal point for the signal on which noise is superimposed. By employing this median filter, an isolating point can be removed while the edge of the signal can be maintained.

In order to effectively remove impulse noise, a number of conventional techniques are used for devising a median filter employment method by the prior art. According to one technique in the prior art, in accordance with the state of an input image signal and the state of a surrounding signal, when a signal to be processed includes impulse noise, the output of a median filter is provided in the spatially vertical or transverse direction. Whereas when a signal to be processed does not include impulse noise, the signal to be processed is simply provided.

In a different technique, when impulse noise is present in a flat area of an image signal, the average value of surrounding image signals is provided for a pixel to be processed in order to remove the noise.

Yet in another technique, the medians of signals to be processed and preceding and succeeding signals are extracted and are added at a predetermined ratio to the values of input signals, or to the averages of the input signal values and the preceding and succeeding signal values.

As described above, consequently in order to remove impulse noise from an image signal or an audio signal, generally, a median filter is employed. However, a median filter can not effectively restore a detail signal or a signal wherein short rises and falls are repeated and it is desirous to employ a new technique that takes these requirements into consideration.

SUMMARY OF THE INVENTION

The shortcomings of the prior art are overcome and additional advantages are provided through a method, apparatus and program product for signal processing a coded signal such that multiple signal points, having individual signal values consonant with coded values, are contiguously arranged in accordance with a predetermined time base order or a predetermined spatial order. In one embodiment a signal restoration unit. The unit is provided for calculating an average value for signal values at signal points immediately preceding and following a predetermined signal point that constitutes the coded signal transmitted by said input unit is provided. In addition, the signal unit also provides for calculating, for each of one or a plurality of sets of two signal points to be selected out of a plurality of signal points preceding the predetermined signal point, a signal value difference for the two selected signal points, and obtaining one or a plurality of first difference values; for calculating, for each of one or a plurality of sets of two signal points to be selected out of a plurality of signal points following the predetermined signal point, a signal value difference for the two selected signal points, and obtaining one or a plurality of second difference values; and for correcting the average value by employing either one or a plurality of either the first or the second, or both the first and the second difference values to obtain a restored value for a signal value at the predetermined signal point.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

In one embodiment of the present invention as will be discussed briefly prior to reference to the figures, for a signal point to be restored that constitutes a coded signal, not only must calculation of a value after restoration be performed, based on values at surrounding signal points, but the status of a signal must be obtained, based on a change in values at surrounding signal points, and a restored value calculated. Specifically, not only must signal values be employed at several (e.g., two) signal points preceding and following a specific signal to be restored, but several (e.g., one) difference values relative to the specific signal point must be obtained. Based on the obtained results, the signal status, i.e., whether the signal point to be restored corresponds to the vertex of a convex or of a concave portion or is a signal point in a flat portion, must be determined. Further, these obtained difference values are employed to calculate the restored value.

When a signal on which impulse noise is superimposed is to be restored, it is preferable that a signal point that is not affected by impulse noise be saved, unchanged, and that an appropriate filter process be performed only for a signal point that has been deteriorated by impulse noise. Thus, a signal point whereon impulse noise is not superimposed and a signal point whereon impulse noise is superimposed must be precisely separated. A number of conventional methods as known by those skilled in the art can be utilized. In one embodiment of the present invention, the process is to be performed for the thus separated signal points on which impulse noise has been superimposed. An apparatus for performing the signal processing as per one embodiment of the present invention is described as illustrated in FIG. 1.

Figure 1:
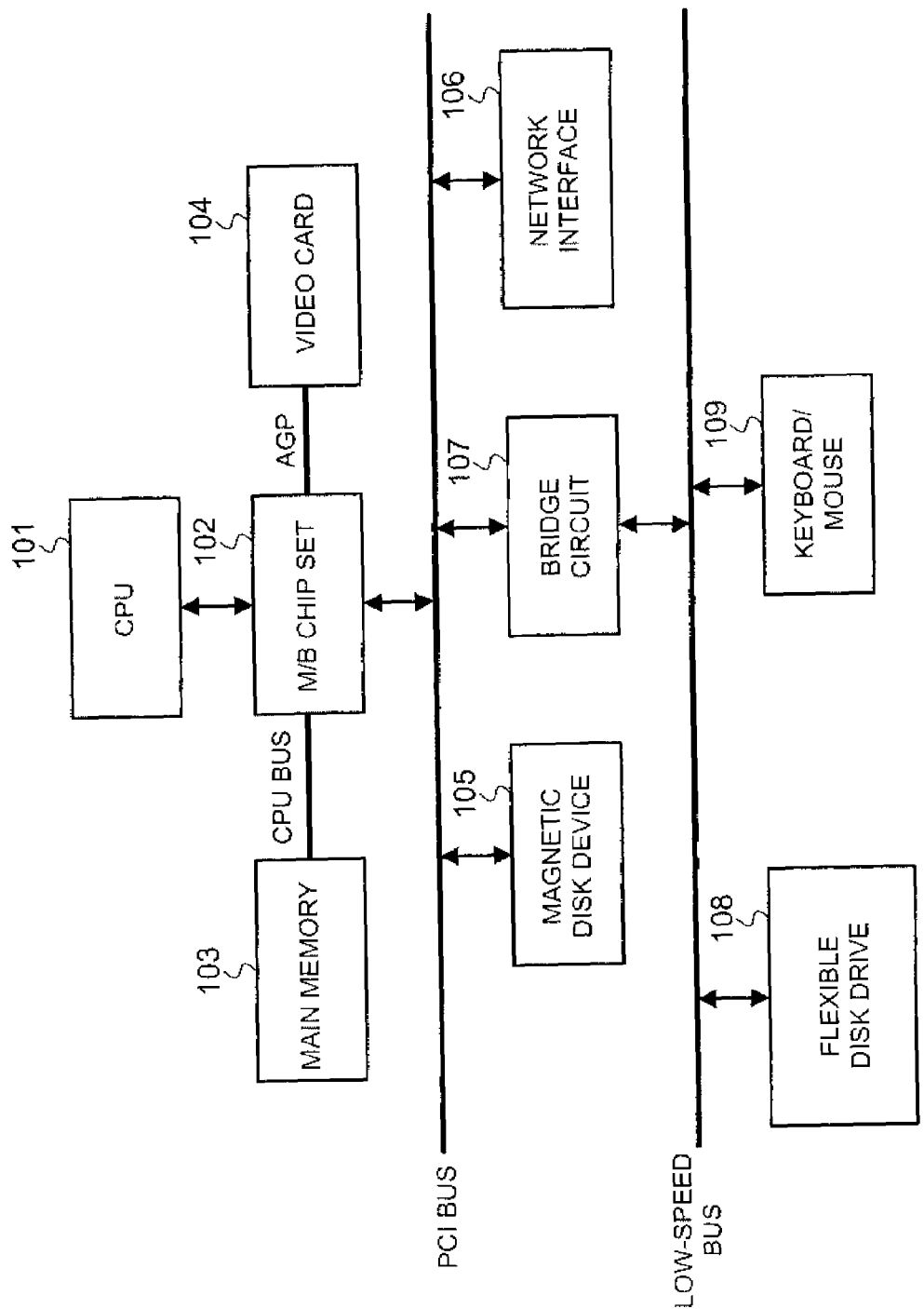
FIG. 1 is a schematic diagram showing an example hardware configuration for a computer that can appropriately perform a signal process according to one embodiment of the present invention.

FIG. 1 is a schematic diagram showing an example hardware configuration appropriate for the performance of the signal processing of this embodiment. In FIG. 1, a computer is shown that comprises: a CPU (Central Processing Unit) 101, which is computation means; a M/B (motherboard) chip set 102; a main memory 103, which is connected to the CPU 101 via a CPU bus and the M/B chip set 102; a video card 104, which is also connected to the CPU 101 via the M/B chip set 102 and an AGP (Accelerated Graphics Port); a magnetic disk device (HDD) 105, a network interface 106 and a bridge circuit 107, which are connected to the M/B chip set 102 via a PCI (Peripheral Component Interconnect) bus; and a flexible disk drive 108 and a keyboard/mouse 109, which are connected to the M/B chip set 102 via a low-speed bus, such as an ISA (Industry Standard Architecture) bus, and the bridge circuit 107 and the PCI bus.

The hardware configuration of the computer in FIG. 1 is merely an example used for the embodiment; various other configurations can be employed so long as the signal processing for this embodiment can be applied. For example, instead of providing the video card 104, only a video memory may be mounted, and the CPU 101 may perform the processing of image data. Or, as an external storage device, a CD-R (Compact Disk Recordable) drive or a DVD-RAM (Digital Versatile Disc Random Access Memory) drive may be provided via an interface, such as an ATA (AT Attachment) interface or a SCSI (Small Computer System Interface) bus.

Figure 2:
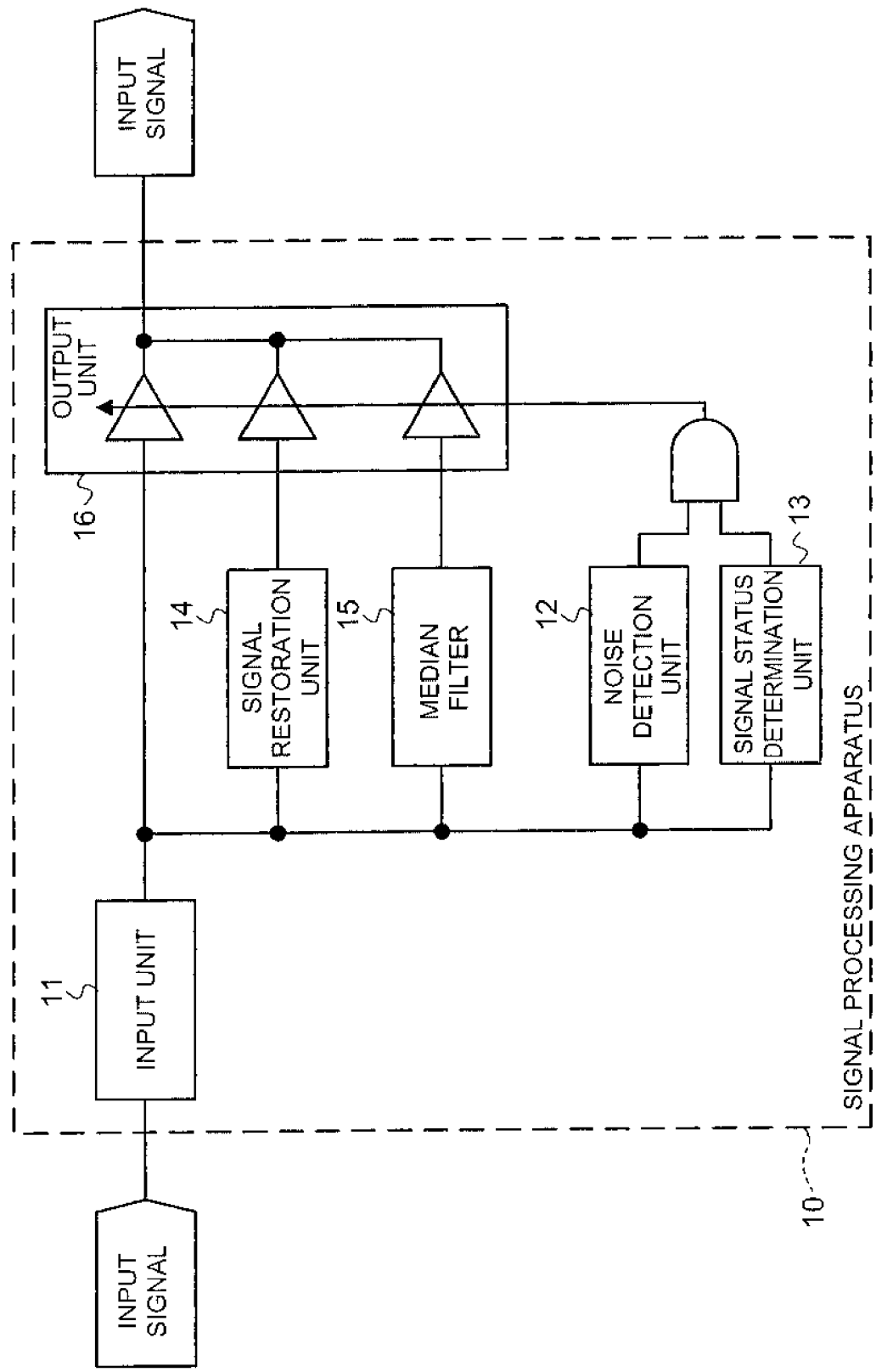
FIG. 2 is a diagram showing the functional arrangement of a signal processing apparatus according to the embodiment.

FIG. 2 is a diagram showing the functional arrangement of the signal processing apparatus according to the embodiment. As shown in FIG. 2, a signal processing apparatus for this embodiment includes: an input unit 11, for receiving a signal to be processed; a noise detection unit 12 and a signal status determination unit 13, for determining the status of an input signal; a signal restoration unit 14 and a median filter 15, for performing a process for removing impulse noise from the input signal; and an output unit 16, for selecting an output signal. While referring to FIG. 2, in the signal processing apparatus 10, the input unit 11 distributes received signals, and a signal for which no processing is performed, i.e., an unchanged signal that is distributed as received, a signal processed by the signal restoration unit 14 and a signal processed by the median filter 15 are obtained. Then, for each signal point, the output unit 16 selectively outputs one of these three signals based on the detection results provided by the noise detection unit 12 and the signal status determination unit 13.

According to this arrangement, the input unit 11 is provided as interface means, such as the network interface 106 of the computer shown in FIG. 1. The input unit 11 receives a coded signal to be processed, and distributes the coded signal to the noise detection unit 12, the signal status determination unit 13, the signal restoration unit 14, the median filter 15 and the output unit 16. The noise detection unit 12 is provided, for example, by the CPU 101, which is controlled by a program in the computer shown in FIG. 1. The noise detection unit 12 determines whether impulse noise has been superimposed on a predetermined signal point of the input signal. A conventional method, such as the method described in the Electronic Information Communication Institute Thesis described above, can be employed to determine whether impulse noise has been superimposed on a signal point.

The signal status determination unit 13 is provided, for example, by the CPU 101, which is controlled by a program in the computer in FIG. 1. The signal status determination unit 13 determines whether a predetermined signal point for an input signal corresponds to the vertex of a convex portion or the vertex of a concave portion. Specifically, an arbitrary signal point is employed and signal values at several signal points preceding and following the arbitrary signal point are obtained. Then, several difference values are calculated for the signal points preceding and following the arbitrary signal point, and based on the results, the status of the arbitrary signal is determined. For example, two signal points are selected preceding and following a specific signal point (signal values for two preceding signal points are defined as a and b, and signal values for two following signal points are defined as c and d), and difference values (a−b and c−d) for these signal values are calculated. When the direction of the change in the value for the two preceding points differs from the direction of the change in the value for the two following points, it can be determined that the specific signal point corresponds to the vertex of a convex or a concave portion of the signal. In this case, when the difference in the signal values for the two preceding points is negative, and the difference in the signal values for the two following points is positive, it is determined that surrounding signal points, including the specific signal point, have an overall ascending or descending shape. Further, when the difference in the signal values for the two preceding points and the difference in the signal values for the two following points are both zero, it can be determined that surrounding signal points, including the specific signal point, are entirely flat.

The signal restoration unit 14 can be provided, for example, by the CPU 101, which is controlled by a program in the computer in FIG. 1. The signal restoration unit 14 performs a process for a predetermined signal point based on the signal values of the surrounding signal points and the signal shape of the surrounding signal points, and removes impulse noise from a signal. Specifically, an arbitrary signal point is employed, and signal values are obtained at several signal points preceding and following the arbitrary signal point, and several difference values are calculated for these signal points. Then, an average of the signal values for the signal points preceding and following the arbitrary signal point, and the obtained difference values, are employed to calculate a restored value for the arbitrary signal point.

For example, let us assume that, in the same manner as described above, the signal status determination unit 13 selects two points preceding and following a specific signal point (signal values are defined as a and b, and c and d). In this case, a difference in the signal values for the two preceding points is a−b, and a difference in the signal values for the two succeeding points is c−d. When the specific signal point corresponds to the vertex of the convex portion of a signal, the restored value is defined as $(b+c)/2+\alpha$. Further, when the specific signal point corresponds to the vertex of the concave portion of a signal, the restored value is defined as $(b+c)/2-\alpha$. It should be noted that $\alpha$ is either |a−b| or |c−d| which has a smaller value. When a larger value is selected, the signal becomes a high frequency signal, and a problem, such as ringing or the production of an artifact, tends to occur that reproduces an output signal. Thus, to avoid this problem, a smaller value is required. The processing performed by the signal status determination unit 13 and the signal restoration unit 14 will be described in detail later.

The median filter 15 is provided, for example, by the CPU 101, which is controlled by a program in the computer in FIG. 1. The median filter 15 performs a median process (filtering) for a predetermined point to remove impulse noise from a signal. The process performed by the median filter 15 is the same process as is performed by a conventional medial filter. Instead of the normal median process, however, a weighted median process may be performed. Furthermore, instead of the median filter 15, means may be provided that employs a conventional method to remove impulse noise from a signal.

The output unit 16 is provided by interface means, such as the network interface 106 of the computer shown in FIG. 1. In accordance with the determination results obtained by the noise detection unit 12 and the signal status determination unit 13, the output unit 16 selectively outputs a signal received directly from the input unit 11 (an unchanged, as received, input signal), a signal restored by the signal restoration unit 14, or a signal restored by the median filter 15, for each signal point of the input signal.

Figure 3:
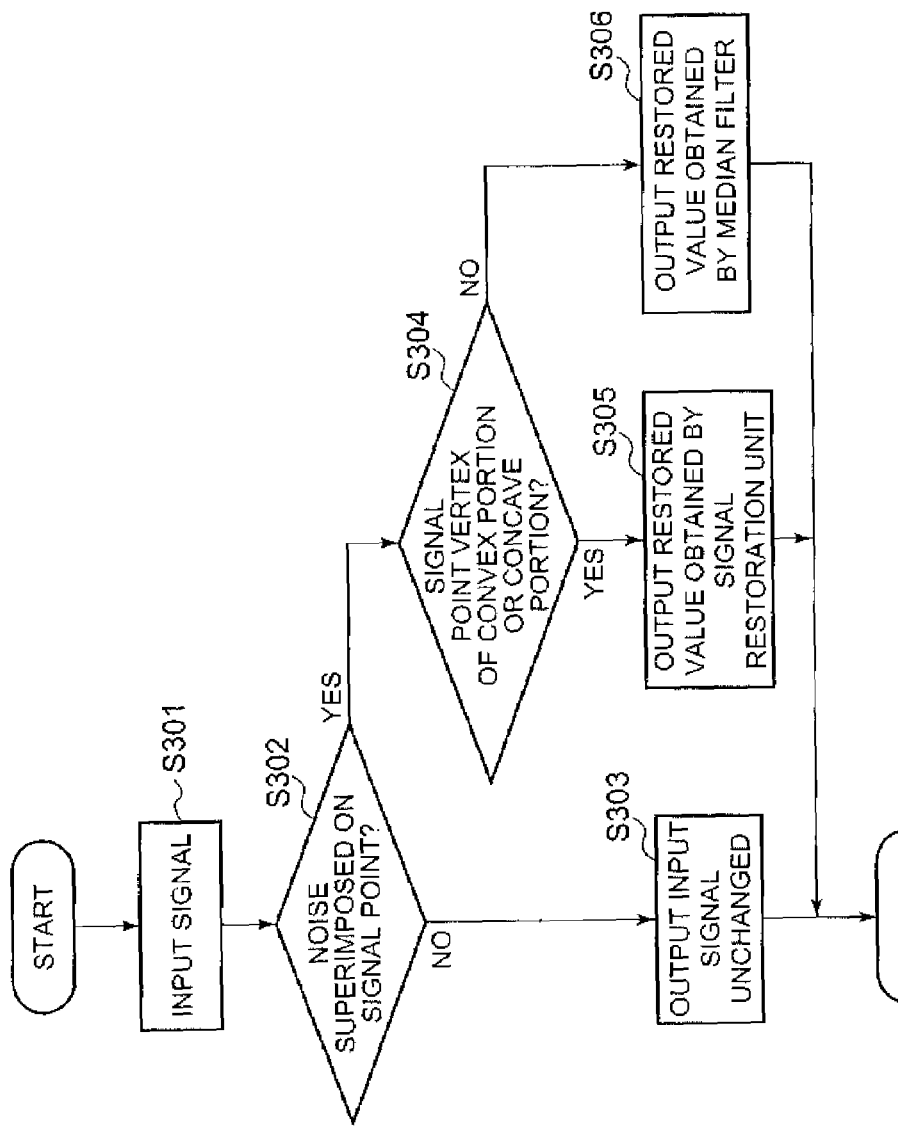
FIG. 3 is a flowchart for explaining the operation of the signal processing apparatus of the embodiment.

FIG. 3 is a flowchart for explaining the operation of the signal processing apparatus 10 of the embodiment having the above described configuration. As was shown in FIG. 2, a signal that enters the signal processing apparatus 10 is separately dispatched across a route for outputting the signal unchanged, a route for outputting a signal restored by the signal restoration unit 14, or a route for outputting a signal restored by the median filter 15. The signal to be output is selected in accordance with the determination results obtained by the noise detection unit 12 and the signal status determination unit 13.

As shown in FIG. 3, when a signal to be processed is transmitted through the input unit 11 (step 301), first, the noise detection unit 12 sequentially examines individual signal points in the input signal to determine whether impulse noise has been superimposed (step 302). When impulse noise has not been superimposed on a specific signal point, the output unit 16 outputs the input signal, unchanged, for the pertinent signal point (step 303).

When impulse noise has been superimposed on the specific signal point, the signal status determination unit 13 examines the status of the input signal to determine whether the specific signal point corresponds to the vertex of a convex portion or the vertex of a concave portion (step 304). When the specific signal point corresponds to the vertex of a convex portion or a concave portion, the output unit 16 selects and outputs, for this signal point, a signal (a restored value) restored by the signal restoration unit 14 (step 305). But when the specific point does not correspond to the vertex of a convex portion or a concave portion, the output unit 16 selects and outputs, for this signal point, a signal (a restored value) restored by the median filter 15 (step 306).

The processing performed by the signal status determination unit 13 and the signal restoration unit 14 will now be described in detail by employing a specific example. In the following example, the status of a signal is determined based on two signal points preceding and two following a specific signal point.

Figure 4A:
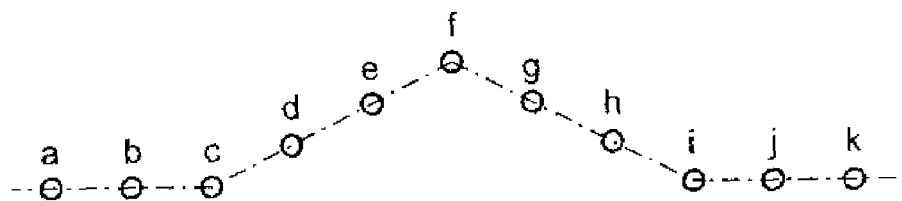
FIGS. 4A to 4C are diagrams for explaining the restoration process of the embodiment for a signal on which impulse noise has been superimposed.
Figure 4B:
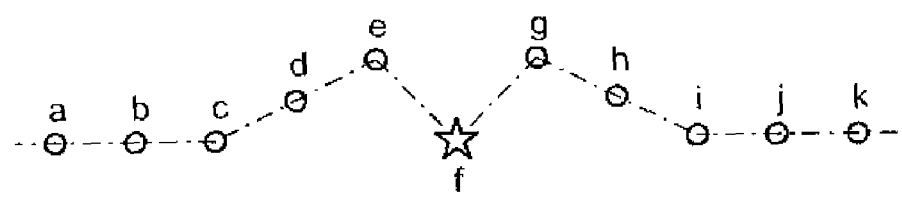
Figure 4C:
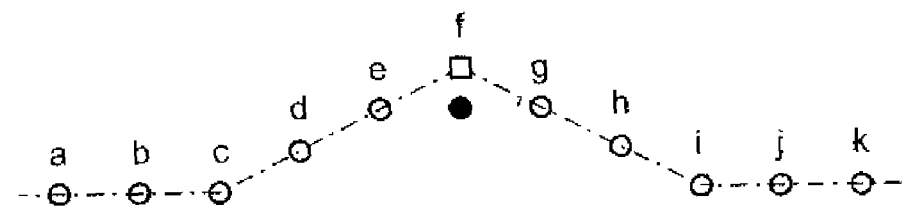

FIGS. 4A to 4C are diagrams for explaining the restoration process employed in the embodiment for a signal on which impulse noise has been superimposed. For individual signal points, the designation of signal point names and values is effected using alphabetical characters. This usage is also applicable to FIGS. 5 to 7 and FIG. 9. The signal in FIG. 4A is an original signal, and in the state in FIG. 4B, impulse noise has been superimposed on signal point f. Then, in the state in FIG. 4C, the restoration process provided for this embodiment has been performed for signal point f.

While referring to FIG. 4A, the original signal has a convex shape from signal point c to i, and signal point f is at the vertex of a convex portion. Since impulse noise has been superimposed on the signal point f, however, its value has been changed as shown in FIG. 4B (as indicated by the star *). Now, assume that the restoration process in this embodiment is to be performed for this signal.

The signal status determination unit 13 calculates a difference d−e for signal values d and e for two points preceding the signal point f and a difference g−h for the two following signal values g and h. According to the signal shown in FIG. 4, since the difference d−e is a negative value, and the difference g−h is a positive value, the signal status determination unit 13 determines that the signal points d to h describe a convex shape, and that the signal point f is at the vertex of the convex portion. Therefore, the output of the signal processing apparatus 10 relative to the signal point f is a signal value (a restored value) provided by the signal restoration unit 14. As for the signal points a to e and g to k, since the noise detection unit 12 determined that impulse noise was not superimposed on these signal points, the input signal is output unchanged.

In accordance with the above definition, the signal restoration unit 14 obtains the restored value for the signal f by calculating $(e+g)/+\alpha$. It should be noted that $\alpha$ is either |d−e| or |g−h| which has a smaller value. In FIG. 4C, a point represented by a black circle indicates $(e+g)/2$, and a point represented by a white square is a restored value to which a has been added. Signal point $(e+g)/2$, represented by the black circle, corresponds to a restored value that is obtained by employing the median filter based on values (e, g) at signal points located immediately preceding and following the signal point f. Therefore, it is understood that the shape of the original signal (see FIG. 4A) can be restored more appropriately with the restored value obtained by this embodiment than with a restored value obtained by the conventional median process. In a case wherein a conventional method other than the median filter 15 is employed to perform signal restoration, it is difficult for the value that corresponds to the vertex of the convex portion, as shown in FIG. 4C, to be appropriately restored, so long as, unlike in the embodiment, the status of the signal point is not obtained by using the differences in the values of the signal points preceding and following the signal point f, and by employing only the values for these signal points to restore the signal point f.

In the operation example shown in FIG. 3, the restoration process of this embodiment is performed for a detail signal or an input signal for which the target signal point corresponds to the vertex of a convex portion or a concave portion of a signal wherein short rises and falls are repeated. However, this embodiment can also be applied for a common edge signal.

Figure 5A:
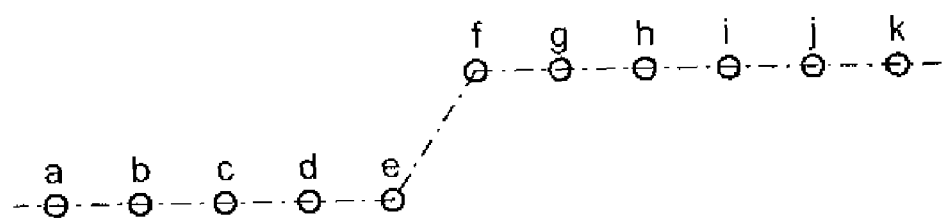
FIGS. 5A to 5C are diagrams for explaining the restoration process of the embodiment for an edge signal on which impulse noise has been superimposed.
Figure 5B:
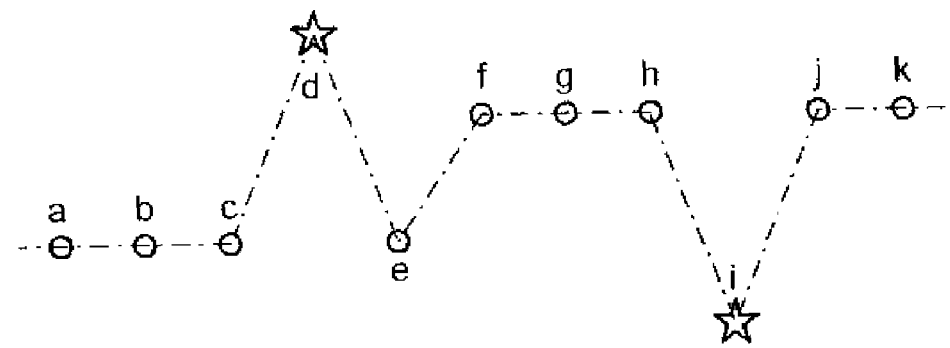
Figure 5C:
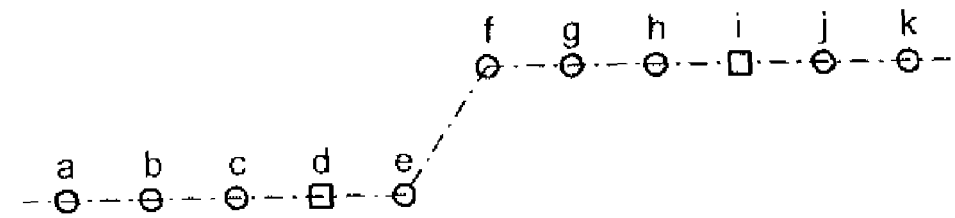

FIGS. 5A to 5C are diagrams for explaining the restoration process provided by the embodiment for an edge signal on which impulse noise is superimposed. The signal in FIG. 5A is the original edge signal, and in the state in FIG. 5B, impulse noise has been superimposed on signal point d and signal point i. In the state in FIG. 5C, the restoration process according to the embodiment has been performed for signal point f.

While referring to FIG. 5A, the values for the original signal are even from signal point a to signal point e, change from signal point e to signal point f (the edge), and are even again from signal point f to signal point k. Since impulse noise is superimposed on signal points d and i, the values of signal points d and i are changed as shown in FIG. 5B (indicated by the stars).

When the signal point d is restored by the signal restoration unit 14, the restored value of the signal point d is (c+e)/2+|b−c|, in accordance with the above definition. Since the value of the input signal is even from signal point a to signal point e, except for the signal point d, |b−c| is substantially zero, and the values of signal points c and e are almost equal. Therefore, substantially the same value as the signal point c or e is obtained as the restored value for signal point d (see FIG. 5C). Similarly, substantially the same value as signal point h or signal point j is obtained as the restored value for of signal point i. Therefore, at step 304 in FIG. 3, not only is a check performed to determine whether the specific signal point corresponds to the vertex of a convex portion or a concave portion, but also, when the signal portions surrounding the target input signal are flat (the signal values are substantially equal, i.e., signal value differences for several signal points preceding and following the target signal point are near zero), the restored value obtained by the signal restoration unit 14 may be output.

As described above, according to the restoration process provided by this embodiment, impulse noise can be effectively removed from a convex/concave signal or a normal edge signal, and an original signal can be restored. However, there is a signal that is inappropriate for the restoration process provided by this embodiment. Specifically, when the direction of the change in values is the same for several points before and after a specific signal point, i.e., when differences in signal values are both negative or positive, satisfactory results can not be obtained by performing the restoration process of this embodiment.

Figure 6A:
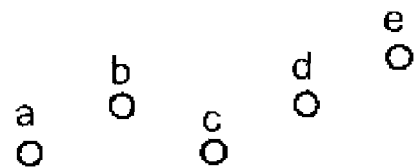
FIGS. 6A and 6B are diagrams showing example signals that are inappropriate for the restoration process of the embodiment.
Figure 6B:
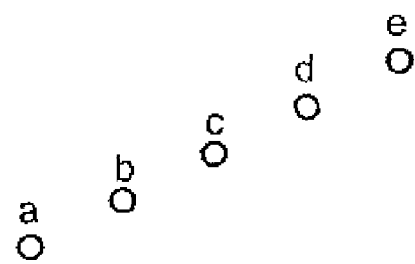

FIGS. 6A and 6B are diagrams showing example inappropriate signals for the restoration process of this embodiment. When impulse noise is superimposed on signal point c of a signal shown in FIG. 6A, (b+d)/2−α should be appropriate for restoring the original signal because the signal point c is at the vertex of the concave portion. However, since a difference a−b and a difference d−e are both negative, it can not be determined whether the signal point c is at the vertex of a convex portion or at the vertex of a concave portion, and thus, which should be employed, (b+d)/2−α or (b+d)/2+α, can not be determined.

On the other hand, for a signal shown in FIG. 6B, since the value of signal c is between the value of signal point b and the value of signal point d, (b+d)/2 is appropriate, and the use of the median process may be employed to obtain satisfactory results.

As described above, when the directions of the changes in values are the same at several points preceding and following a specific signal point, using the signal restoration unit 14 of this embodiment to perform the restoration process is not appropriate. However, only the restoration process provided by the median filter 15 need be performed to obtain, at the least, the same restoration results as in the conventional case. Therefore, it is preferable that the signal processing apparatus 10 of this embodiment be operated in accordance with the following policy. When impulse noise is not superimposed on a specific signal point in an input signal, the input signal is output unchanged. When impulse noise is superimposed on a specific signal point, and when the restoration process performed by the signal restoration unit 14 is effective (i.e., when the specific signal point is at the vertex of a convex portion or a concave portion of the signal, or when the input signal is a normal edge signal), a restored value provided by the signal restoration unit 14 is output. Or when the restoration process performed by the signal restoration unit 14 is inappropriate, the restored value obtained by the median filter 15 (or obtained by using a conventional method) is output.

An explanation will now be given for a special case wherein impulse noise is sequentially superimposed on a plurality of signal points. Originally, it is considered extremely rare for an impulse noise to be sequentially superimposed on a plurality of signal points. However, when such a phenomenon does occur, it is difficult for the status of a signal to be obtained by an operation provided by this embodiment, and for satisfactory restoration results to be obtained. In a case wherein impulse noise is superimposed on only about two signal points, an appropriate restored value can be obtained by performing the following process.

FIGS. 7A to 7D are diagrams showing an example wherein impulse noise is superimposed on two sequential signal points. In the state shown in FIG. 7A, of signal points a to k, impulse noise is superimposed on signal points f and g. In the state shown in FIG. 7B, the signal value for signal point g is estimated by performing linear interpolation. In the state in FIG. 7C, signal point f is restored, and in the state in FIG. 7D, signal point g is restored.

Figure 7A:
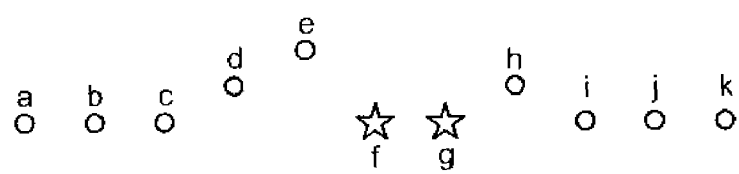
FIGS. 7A to 7D are diagrams for explaining an example wherein the restoration process of the embodiment is performed for two sequential signals on which impulse noise has been superimposed.
Figure 7B:
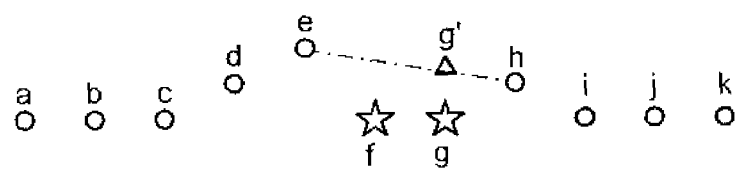
Figure 7C:
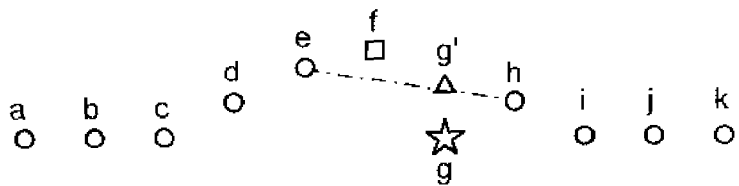
Figure 7D:
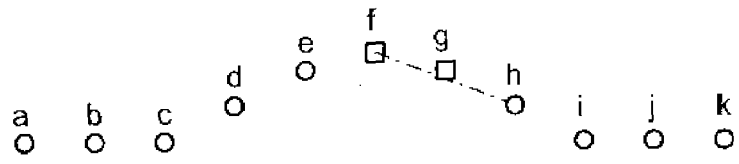

When, as shown in FIG. 7A, impulse noise is superimposed on two sequential signal points, a signal value for one of the signal points is estimated by performing linear interpolation. In the example in FIG. 7B, the signal value for following signal point g is estimated by performing linear interpolation (estimated value g'), and the estimated value g' is indicated by a triangle.

Following this, based on this estimated value, the signal value for the other signal point on which impulse noise is superimposed is restored by using the above described method of the embodiment. Thus, in the example in FIG. 7C, signal point f is restored based on signal points d and e and the estimated value g' and signal point h.

In accordance with the definition of the restored value in the embodiment, the restored value of signal point f is (e+g')/2+α. Further, since the estimated value g' is represented as (e+h)/2, the restored value is calculated by using $$\text{signal point } f = (e+(e+h)/2)/2+\alpha = (3e+h)/4+\alpha.$$

It should be noted that the sign α is negative when a signal has a concave shape.

Finally, based on the restored signal, the actual signal value of the signal point g, for which the signal value was previously estimated using linear interpolation, is restored using the method of the embodiment. In the example shown in FIG. 7D, signal point g is restored based on signal point e, the restored signal point f and signal points h and i. The restored value of signal point g is obtained by calculating (f+h)/2+α, using the restored value of signal point f.

Through the above processing, the location of a signal point that is first estimated by performing linear interpolation can be fixed as a following signal point or a preceding signal point, or can be dynamically determined. For example, signal values for signal points immediately preceding and following the signal point on which impulse noise has been superimposed can be compared, and a signal point near one having a smaller signal value can be employed as a target for estimation by performing linear interpolation. That is, in the example in FIG. 7A, signal points e and h are compared, and signal point g, which is near signal point h, the one having the smaller value, is employed as the target to be estimated using interpolation.

As described above, according to the embodiment, an appropriate restoration value, with which the shape of an original signal can be satisfactorily restored, can be obtained for a signal, such as a detail signal or a convex and concave signal wherein short rises and falls are repeated, having a shape for which restoration is difficult using a conventional method, such as a medial filter. Further, as described above, since the restoration method of the embodiment is employed with conventional restoration means, a practical signal processing apparatus can be provided wherein, when the restoration method of the embodiment can effectively be used for a signal, a more appropriate signal restoration can be performed than is conventionally available, and wherein, when the restoration method of the embodiment is not appropriate, at the least, the same restoration results can be obtained as are available in the conventional case.

According to the configuration of the signal processing apparatus of this embodiment, for an input signal, a restored value can be obtained using the method of the embodiment, and a restored value can also be obtained using the median filter (the conventional method), so that an appropriate signal can be selectively output that is in accord with the status of the input signal. However, this invention is not limited to this configuration. For example, the status of an input signal may be obtained, and thereafter, a restored value may be obtained, and output, by selectively employing an appropriate method.

Figure 8:
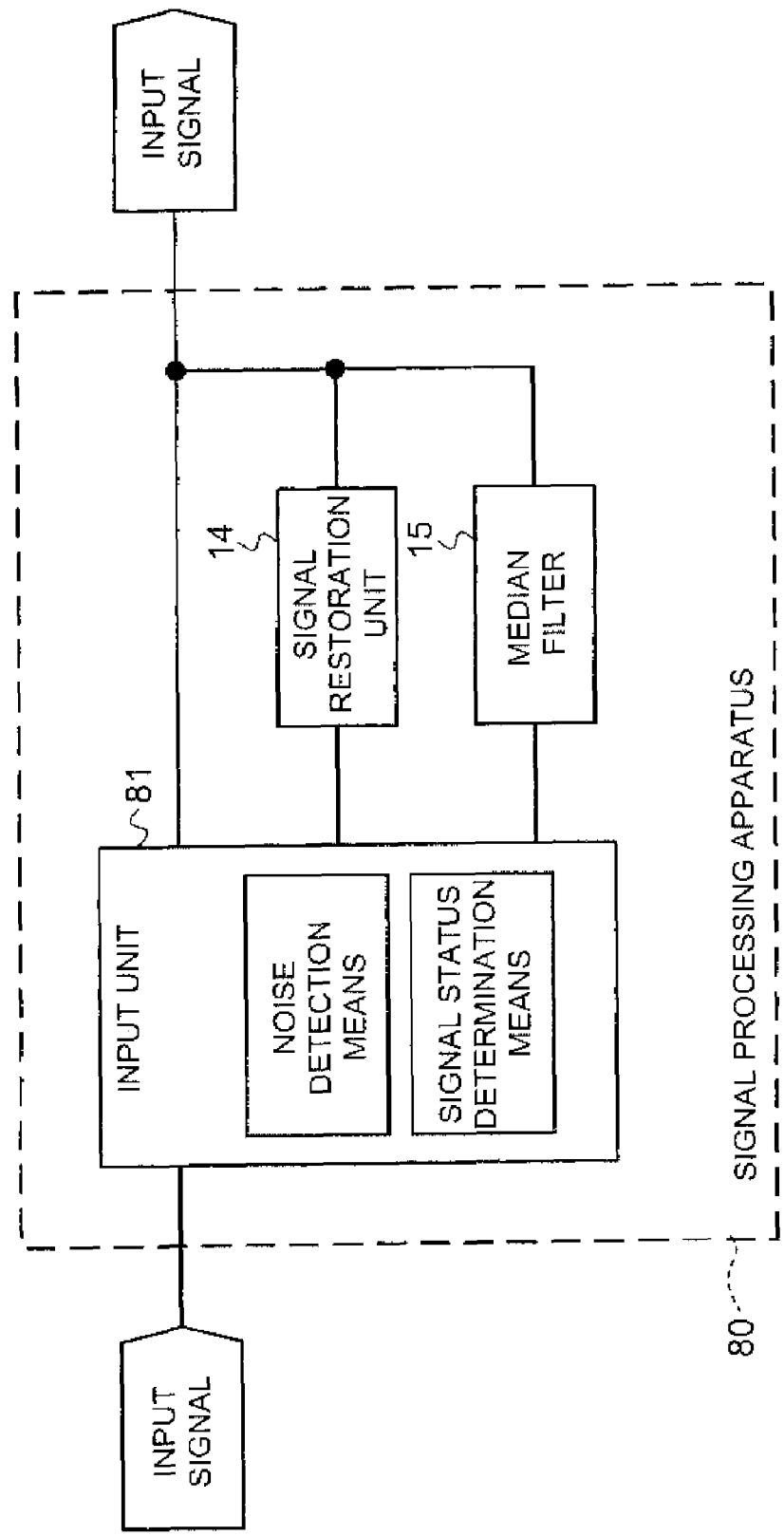
FIG. 8 is a diagram showing the functional arrangement of a signal processing apparatus according to another embodiment of the present invention.
Figure 9A:
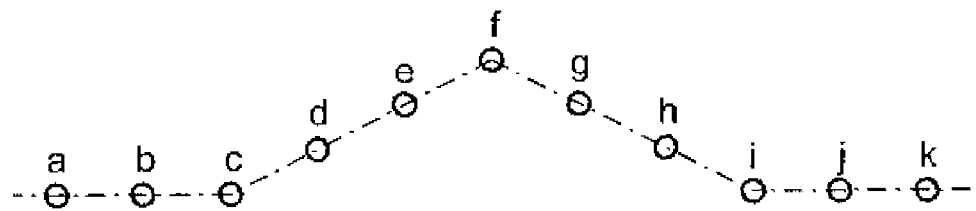
FIGS. 9A to 9C are diagrams for explaining a conventional restoration process for a signal on which impulse noise has been superimposed.
Figure 9B:
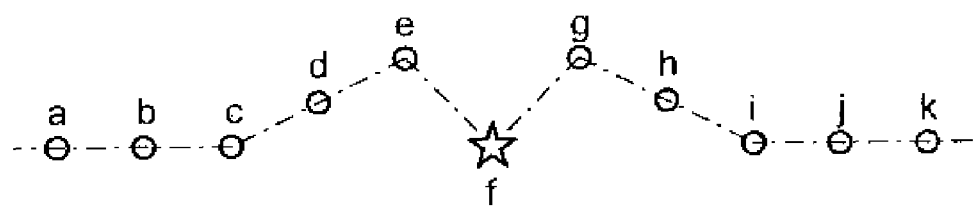
Figure 9C:
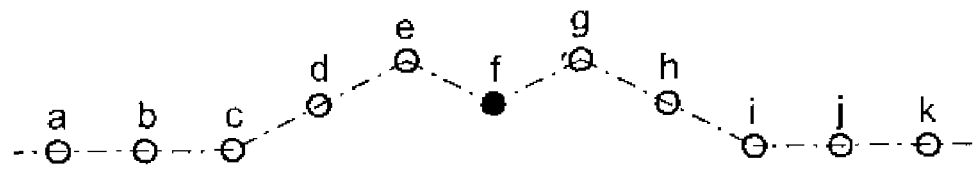

FIG. 8 is a diagram showing the functional configuration of a signal processing apparatus according to another embodiment of the present invention. A signal processing apparatus 80 in FIG. 8 includes: an input unit 81, for receiving a coded signal to be processed; a signal restoration unit 14; and a median filter 15. In this configuration, since the signal restoration unit 14 and the median filter 15 are the same arrangement as those in FIG. 2, the same reference numerals are provided, and no further explanation for them will be given. As shown in FIG. 8, the signal processing apparatus 80 includes a route for outputting an input signal unchanged, a route for outputting a signal restored using the signal restoration unit 14 and a route for outputting a signal restored using the median filter 15. For each signal point in the input signal, the input unit 81 outputs a signal via one of these routes.

When the signal processing apparatus 80 is constituted by the computer shown in FIG. 1, the input unit 81 is provided by interface means such as a network interface 106, and a CPU 101 which is controlled by a program, and includes means (noise detection means and signal status determination means) for providing the same functions as the noise detection unit 12 and the signal status determination unit 13. The input unit 81 employs the noise detection means to determine whether impulse noise has been superimposed on a predetermined signal point of an input signal. When it is determined that impulse noise has been superimposed on the input signal, the signal status determination means determines whether the predetermined signal point of the input signal corresponds to the vertex of a convex portion or the vertex of a concave portion, or whether the signal is a normal edge signal.

In accordance with the determination results, the input unit 81 in FIG. 8 outputs, for each signal point of the input signal, the signal value for the signal point and signal values for several signal points preceding and following the pertinent signal point, along a route for outputting the input signal unchanged, along a route for outputting a signal restored by the signal restoration unit 14, or along a route for outputting a signal obtained by the median filter 15. Specifically, when impulse noise has not been superimposed on a specific signal point of an input signal, the signal is output along the route for outputting an input signal unchanged. When impulse noise has been superimposed on a specific signal point of the input signal, and when the restoration process performed by the signal restoration unit 14 is effective (i.e., when the specific signal point corresponds to the vertex of a convex portion or a concave portion of the signal, or when the input signal is a normal edge signal), the signal is output along the route for outputting a restored value provided by the signal restoration unit 14. And when the restoration process by the signal restoration process is inappropriate, the signal is output along the route for outputting a restored value obtained by the median filter 15. With this arrangement, an appropriate restoration process can be performed for each signal point of an input signal, and a new signal value can be output.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A signal processing apparatus, for processing a coded signal formed so that multiple signal points, having individual signal values consonant with coded values, are contiguously arranged in accordance with a predetermined time base order or a predetermined spatial order, comprising:

a signal restoration unit, the signal restoration unit configured to perform a method comprising:

calculating an average value for signal values at signal points immediately preceding and following a predetermined signal point, wherein said predetermined signal point comprises the coded signal transmitted by an input unit;

calculating, for each of one or a plurality of sets of two signal points to be selected out of a plurality of signal points preceding the predetermined signal point, a signal value difference for the two selected signal points, and obtaining one or a plurality of first difference values;

calculating, for each of one or a plurality of sets of two signal points to be selected out of a plurality of signal points following the predetermined signal point, a signal value difference for the two selected signal points, and obtaining one or a plurality of second difference values; and correcting the average value by employing either one or a plurality of either the first or the second, or both the first and the second difference values to obtain a restored value for a signal value at the predetermined signal point.

2. A signal processing apparatus according to claim 1, wherein said input unit receives the coded signal to be processed.

3. A signal processing apparatus according to claim 2, further comprising:
a signal status determination unit, for determining a relationship between the predetermined signal point and each of a plurality of signal points preceding and following the predetermined signal point; and
an output unit, for employing determination results obtained by said signal status determination unit to selectively output, as a new signal value at the predetermined signal point, either a restored value obtained by said signal restoration unit, or the signal value at the predetermined signal point that is transmitted by said input unit.

4. A signal processing apparatus according to claim 3, wherein, when said signal status determination unit determines that the predetermined signal point is a point corresponding to a vertex of a convex portion of the coded signal transmitted by said input unit, said signal restoration unit obtains a restored value for the predetermined signal point by adding to the average value a difference value that is selected from among the first difference values and the second difference values.

5. A signal processing apparatus according to claim 3, wherein, when said signal status determination unit determines that the predetermined signal point is a point corresponding to a vertex of a concave portion of the coded signal transmitted by said input unit, said signal restoration unit obtains a restored value for the predetermined signal point by subtracting from the average value a difference value that is selected from among the first difference values and the second difference values.

6. A signal processing apparatus according to claim 3, wherein said signal status determination unit determines that a change direction for a signal value differs between the signal points preceding and following the predetermined signal point, and said output unit outputs, as a new signal value at the predetermined signal point, a restored value provided by said signal restoration unit.

7. A signal processing apparatus according to claim 3, wherein said signal status determination unit determines that a difference between the signal values at a plurality of signal points preceding or following the predetermined signal point falls within a predetermined range, said output unit outputs, as a new signal value at the predetermined signal point, a restored value provided by said signal restoration unit.

8. A signal processing apparatus according to claim 3, further comprising:
a median filter, to be used to obtain a restored value for a signal value at an arbitrary signal point included in the coded signal transmitted by said input unit,
wherein said output unit employs determination results obtained by said signal status determination unit to selectively output, as a new signal value at the predetermined signal point, either a restored value provided by said signal restoration unit, a restored value obtained using said median filter, or the signal value at the predetermined signal point that is transmitted by said input unit.

9. A signal processing apparatus according to claim 2, wherein, when noise is superimposed on signal values at two contiguous signal points in the coded signal transmitted by said input unit, said signal restoration unit performs linear interpolation to obtain an estimated value at one of the signal points; and based on the estimated value and values at surrounding signal points, calculates a restored value for the other signal point whereat noise is superimposed, and employs the restored value and values at surrounding signal points to calculate a restored value for the signal point for which the estimated value was first obtained.

10. A signal processing apparatus according to claim 2, further comprising:
a signal status determination unit, for determining a relationship for a predetermined signal point, included in the coded signal received from said input unit, and each of a plurality of signal points preceding and following the predetermined signal point, and for, in accordance with results thus determined, permitting said signal restoration unit to perform a process.

11. A signal processing apparatus according to claim 2, further comprising:
a noise detection unit, for determining whether noise is superimposed on a signal value at a predetermined signal point included in the coded signal that is inputted;
an output unit for, when said noise detection unit determines that noise is not superimposed on the signal value at the predetermined signal point, outputting as a new signal value for the predetermined signal point the signal value for the predetermined signal point that has been inputted, and for, when said noise detection unit determines that noise has been superposed on the signal value at the predetermined signal point, outputting as a new signal value for the predetermined signal point a restored value provided by the signal restoration unit.

12. A signal processing apparatus according to claim 11, further comprising:
a signal status determination unit, for determining a relationship between the predetermined signal point and each of a plurality of signal points preceding and following the predetermined signal point; and
a median filter, to be used to obtain a restored value for the signal value at the predetermined signal point,
wherein, when said noise detection unit determines that noise has been superposed on the signal value at the predetermined signal point, said output unit selectively outputs a restored value provided by said signal restoration unit or a restored value obtained using said median filter.

13. A signal processing method, which is performed by a computer for a coded signal formed so that multiple signal points, having individual signal values consonant with coded values, are contiguously arranged in accordance with a predetermined time base order or a predetermined spatial order, comprising the steps of:
obtaining, through a signal restoration unit, a restored value for a signal value at the predetermined signal point, said obtaining further comprising the method of:
calculating an average value for signal values at signal points immediately preceding and following a predetermined signal point, wherein said predetermined signal point comprises the coded signal that is inputted;
calculating, for each of one or a plurality of sets of two signal points to be selected out of a plurality of signal points preceding the predetermined signal point, a signal value difference for the two selected signal points, and obtaining one or a plurality of first difference values;

calculating, for each of one or a plurality of sets of two signal points to be selected out of a plurality of signal points following the predetermined signal point, a signal value difference for the two selected signal points, and obtaining one or a plurality of second difference values; and correcting the average value by employing either one or a plurality of either the first or the second, or both the first and the second difference values.

14. A signal processing method according to claim 13, further comprising the steps of:

receiving, by an input unit, the coded signal to be processed; and when noise is superimposed on signal values at two contiguous signal points in the coded signal that is inputted, performing linear interpolation to obtain an estimated value at one of the signal points;

based on the estimated value and values at surrounding signal points, calculating a restored value for the other signal point whereat noise is superimposed; and employing the restored value and values at surrounding signal points to calculate a restored value for the signal point for which the estimated value was first obtained.

15. A signal processing method according to claim 13, further comprising the steps of:

determining, by a noise detection unit, whether noise is superimposed on a signal value at a predetermined signal point included in the coded signal that is inputted;

when said noise detection unit determines that noise is not superimposed on the signal value at the predetermined signal point, outputting as a new signal value for the predetermined signal point the signal value for the predetermined signal point that has been inputted; and when said noise detection unit determines that noise has been superposed on the signal value at the predetermined signal point, outputting as a new signal value for the predetermined signal point a restored value provided by the signal restoration unit.

16. A program product that permits a computer to perform a signal process for a coded signal formed so that multiple signal points, having individual signal values consonant with coded values, are contiguously arranged in accordance with a predetermined time base order or a predetermined spatial order, the computer program product comprising:

a storage medium readable by a processing circuit and storing instructions for execution by the processing circuit for performing a method comprising:

obtaining a signal value at a predetermined signal point of the coded signal and signal values at several signal points before and after the predetermined signal point; and obtaining a restored value for a signal value at the predetermined signal point, said obtaining performing a method comprising:

calculating an average value for signal values at signal points immediately preceding and following a predetermined signal point that constitutes the coded signal transmitted by an input unit;

calculating, for each of one or a plurality of sets of two signal points to be selected out of a plurality of signal points preceding the predetermined signal point, a signal value difference for the two selected signal points, and obtaining one or a plurality of first difference values;

calculating, for each of one or a plurality of sets of two signal points to be selected out of a plurality of signal points following the predetermined signal point, a signal value difference for the two selected signal points, and obtaining one or a plurality of second difference values; and correcting the average value by employing either one or a plurality of either the first or the second, or both the first and the second difference values.

17. A program product according to claim 16, further comprising:

determining a relationship between the predetermined signal point and each of a plurality of signal points preceding and following the predetermined signal point, said determining providing a determination result; and employing the determination result to selectively output, as a new signal value at the predetermined signal point, either the restored value or the signal value at the predetermined signal point that is inputted.

18. A program product according to claim 16, further comprising:

outputting the restored value when a change direction for a signal value differs between signal points preceding and following the predetermined signal point.

19. A program product according to claim 8, further comprising:

outputting the restored value when a difference between the signal values at a plurality of signal points preceding or following the predetermined signal point falls within a predetermined range.

20. A program product according to claim 16, further comprising:

when noise is superimposed on signal values at two contiguous signal points in the coded signal that is inputted, performing linear interpolation to obtain an estimated value at one of the signal points; and based on the estimated value and values at surrounding signal points, calculating a restored value for the other signal point whereat noise is superimposed, and employing the restored value and values at surrounding signal points to calculate a restored value for the signal point for which the estimated value was first obtained.

* * * * *